United States Patent
Huang (10) Patent No.: US 11,139,110 B2
(45) Date of Patent: Oct. 5, 2021

(54) TRANSFORMER AND METHOD OF GENERATING MULTIPLE MULTIPHASE OUTPUT SIGNALS

(71) Applicant: THE BOEING COMPANY, Chicago, IL (US)

(72) Inventor: Jian Huang, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 263 days.

(21) Appl. No.: 16/417,204

(22) Filed: May 20, 2019

(65) Prior Publication Data
US 2020/0373082 A1 Nov. 26, 2020

(51) Int. Cl.
| H01F 30/12 | (2006.01) |
| H02M 7/53 | (2006.01) |
| H02M 7/06 | (2006.01) |

(52) U.S. Cl.
CPC .............. *H01F 30/12* (2013.01); *H02M 7/06* (2013.01); *H02M 7/53* (2013.01)

(58) Field of Classification Search
CPC ...................................................... H01F 30/12

USPC .............................................................. 336/5
See application file for complete search history.

(56) References Cited

U.S. PATENT DOCUMENTS

| 4,922,400 A | 5/1990 | Cook |
| 5,050,058 A * | 9/1991 | April .................... H02M 7/17 363/65 |
| 5,055,992 A | 10/1991 | Cook |
| 10,049,811 B2 | 10/2018 | Huang et al. |

* cited by examiner

*Primary Examiner* — Hal Kaplan
(74) *Attorney, Agent, or Firm* — Moore IP Law (57) ABSTRACT

An apparatus includes a plurality of input nodes configured to receive a multiphase alternating current (AC) input signal. The apparatus further includes a plurality of inductors, a neutral terminal, a first plurality of output nodes, and a second plurality of output nodes. The plurality of inductors is coupled to the plurality of input nodes, and the neutral terminal is coupled to the plurality of inductors. The first plurality of output nodes is coupled to the plurality of inductors and is configured to output a first multiphase AC output signal. The second plurality of output nodes is coupled to the plurality of inductors and is configured to output a second multiphase AC output signal.

20 Claims, 7 Drawing Sheets

TRANSFORMER AND METHOD OF GENERATING MULTIPLE MULTIPHASE OUTPUT SIGNALS

FIELD

The present disclosure is generally related to electrical components and more specifically to transformers.

BACKGROUND

Aircraft and other vehicles include electrical components that provide electrical energy (i.e., power) to various vehicle systems and devices. For example, an aircraft can include a generator that provides alternating current (AC) power and can further include cables (e.g., "feeders") that provide the AC power to certain components of the aircraft. In some designs, frequency of the AC power is variable. For example, engine speed may vary and may change frequency of electrical signals provided by the generator.

Certain aircraft use an inverter and a transformer to adjust electrical signals provided by a generator. For example, in some aircraft, an inverter changes a variable frequency signal to a constant frequency signal, such as a 400 hertz (Hz) signal. Further, in some aircraft, a transformer is coupled to an output of the inverter and is configured to "step down" electrical signals, enabling higher-voltage signals to be transmitted over reduced-size feeders.

Such electrical components and systems can use significant area of an aircraft, reducing available area for passengers, crew, cargo, and other aircraft components, as well as increasing production cost. Further, electrical components and systems of an aircraft can add a significant amount of weight to an aircraft, increasing aircraft fuel consumption. As particular example, frequency conversion techniques and components can reduce efficiency of power generation, increase vehicle weight, or both. As another example, in some designs, the output side of a transformer is large and heavy (e.g., due to large variation in frequencies of signals provided to the input side of the transformer).

SUMMARY

In a particular example, an apparatus includes a plurality of input nodes configured to receive a multiphase alternating current (AC) input signal. The apparatus further includes a plurality of inductors, a neutral terminal, a first plurality of output nodes, and a second plurality of output nodes. The plurality of inductors is coupled to the plurality of input nodes, and the neutral terminal is coupled to the plurality of inductors. The first plurality of output nodes is coupled to the plurality of inductors and is configured to output a first multiphase AC output signal. The second plurality of output nodes is coupled to the plurality of inductors and is configured to output a second multiphase AC output signal.

In another example, a system includes a transformer including a neutral terminal and a plurality of input nodes configured to receive a multiphase AC input signal. The transformer further includes a first plurality of output nodes and a second plurality of output nodes. The first plurality of output nodes is configured to output a first multiphase AC output signal in response to the multiphase AC input signal, and the second plurality of output nodes is configured to output a second multiphase AC output signal in response to the multiphase AC input signal. The system further includes an inverter coupled to the transformer and configured to generate a third multiphase AC output signal based on the first multiphase AC output signal. The multiphase AC input signal and the second multiphase AC output signal have a first frequency, and the third multiphase AC output signal has a second frequency different than the first frequency.

In another example, a method includes receiving a multiphase AC input signal at a plurality of input nodes of a transformer. The method further includes generating, based on the multiphase AC input signal and by the transformer, a first multiphase AC output signal at a first plurality of output nodes of the transformer and a second multiphase AC output signal at a second plurality of output nodes of the transformer. The method further includes generating a third multiphase AC output signal based on the first multiphase AC output signal and by an inverter. The multiphase AC input signal and the second multiphase AC output signal have a first frequency, and the third multiphase AC output signal has a second frequency that is different than the first frequency.

DETAILED DESCRIPTION

In a particular implementation, a transformer is configured to generate a plurality of multiphase alternating current signals. Instead of including the transformer at the output of an inverter as in some conventional designs, the transformer is included at the input of an inverter in accordance with some aspects of the disclosure. As a result, operations of the transformer (e.g., stepping down voltage of electrical signals provided by a generator) can be performed prior to operations of the inverter (e.g., prior to converting variable frequency signals to constant frequency signals).

By performing transformer operations prior to inverter operations, variable frequency signals can be selectively provided from the transformer to some electrical systems that can utilize variable frequency power, such as certain lighting systems or window heaters, as illustrative examples. In a particular example, another output signal is provided from the transformer to an inverter to generate constant frequency signals for components that operate using constant frequency power. By selectively providing variable frequency power to certain components, inefficiency associated with frequency conversion (e.g., parasitic power consumption associated with an inverter) can be reduced.

Alternatively or in addition, in some cases, a size of one or more components can be reduced as compared to conventional designs. For example, in some implementations, a frequency (or an average frequency) of an input signal to an inverter is greater than a frequency of an output signal of the inverter. In this case, by "moving" a transformer from an output side of the inverter to an input side of the inverter in accordance with some aspects of the disclosure, a higher-frequency signal is applied to the transformer (as compared to other designs that couple an input of a transformer to an output of an inverter). As a result of applying the higher-frequency signal to the transformer, a physical size of the transformer can be reduced as compared to certain conventional designs, decreasing weight and fuel consumption of a vehicle, as an illustrative example.

In a particular example, the transformer has a neutral forming configuration and is configured to output a plurality of multiphase signals. For example, in some implementations, the transformer has a modified star configuration that includes a first plurality of output nodes and a second plurality of output nodes. In some examples, the first plurality of output nodes is configured to provide a first multiphase alternating current (AC) signal to an inverter, and the second plurality of output nodes is configured to provide a second multiphase AC signal to one or more electrical systems that are operable based on variable frequency power. Additional aspects of an illustrative example of a transformer are described further with reference to FIG. 1.

Figure 1:
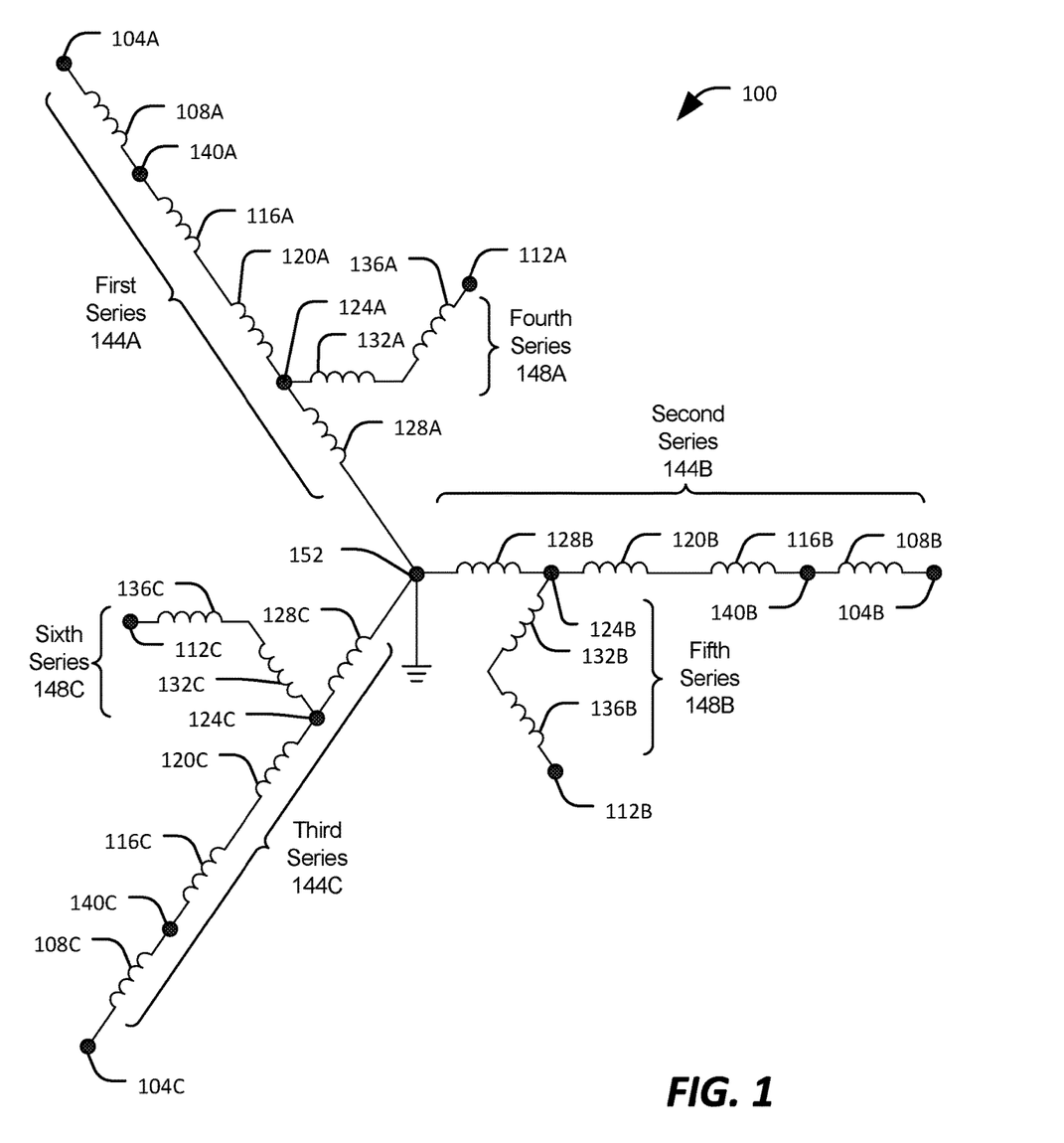
FIG. 1 is a diagram illustrating an example of a transformer in accordance with aspects of the disclosure.

Referring to FIG. 1, a particular illustrative example of a transformer is depicted and generally designated 100. In some implementations, the transformer 100 is included in a vehicle, such as an aircraft.

The transformer 100 includes a plurality of input nodes. To illustrate, in FIG. 1, the transformer 100 includes a first input node 104A, a second input node 104B, and a third input node 104C.

The transformer 100 further includes a plurality of inductors coupled to the input nodes 104A, 104B, and 104C. For example, in FIG. 1, the transformer 100 includes a first series of inductors 144A coupled to the first input node 104A. As another example, in FIG. 1, the transformer 100 includes a second series of inductors 144B coupled to the second input node 104B and further includes a third series of inductors 144C coupled to the third input node 104C.

In FIG. 1, the first series of inductors 144A includes a first inductor 108A coupled to the first input node 104A. FIG. 1 also illustrates that the second series of inductors 144B includes a second inductor 108B coupled to the second input node 104B and that the third series of inductors 144C includes a third inductor 108C coupled to the third input node 104C.

To further illustrate, in FIG. 1, the first series of inductors 144A further includes a first particular inductor 128A coupled to a first particular node 124A of the transformer 100. FIG. 1 also illustrates that the second series of inductors 144B includes a second particular inductor 128B coupled to a second particular node 124B of the transformer 100 and that the third series of inductors 144C includes a third particular inductor 128C coupled to a third particular node 124C of the transformer 100.

In the example of FIG. 1, the first series of inductors 144A includes the inductors 108A, 128A and further includes inductors 116A, 120A. Further, in the example of FIG. 1, the second series of inductors 144B includes the inductors 108B, 128B and inductors 116B, 120B, and third series of inductors 144C includes the inductors 108C, 128C and inductors 116C, 120C. It should be appreciated that the particular number of inductors depicted in FIG. 1 is illustrative and that in other implementations the transformer 100 can include a different number of inductors than illustrated in the example of FIG. 1.

The transformer 100 further includes a neutral terminal 152. The series of inductors 144A, 144B, and 144C are coupled to the neutral terminal 152. For example, in FIG. 1, the inductors 128A, 128B, and 128C are coupled to the neutral terminal 152. In a particular example, the transformer 100 has a neutral-forming configuration (e.g., where the neutral terminal 152 and the series of inductors 144A, 144B, and 144C provide paths from the input nodes 104A, 104B, and 104C to ground). In a particular example, the first series of inductors 144A, the second series of inductors 144B, and the third series of inductors 144C are arranged in a star configuration via the neutral terminal 152.

The transformer 100 further includes a fourth series of inductors 148A coupled to the first series of inductors 144A and to the first particular node 124A. In the example of FIG. 1, the fourth series of inductors 148A includes an inductor 132A and an inductor 136A. The example of FIG. 1 also illustrates that the transformer 100 includes a fifth series of inductors 148B coupled to the second series of inductors 144B and to the second particular node 124B and further includes a sixth series of inductors 148C coupled to the third series of inductors 144C and to the third particular 124C. In the example of FIG. 1, the fifth series of inductors 148B includes an inductor 132B and an inductor 136B, and the sixth series of inductors 148C includes an inductor 132C and an inductor 136C. It should be appreciated that the particular number of inductors depicted in FIG. 1 is illustrative and that in other implementations the transformer 100 can include a different number of inductors than illustrated in the example of FIG. 1.

The transformer 100 includes a first plurality of output nodes. In a particular example, the first plurality of output nodes includes a first output node 140A, a second output node 140B, and a third output node 140C. In FIG. 1, the first inductor 108A is coupled to the first output node 140A, the second inductor 108B is coupled to the second output node 140B, and the third inductor 108C is coupled to the third output node 140C.

The transformer 100 further includes a second plurality of output nodes. In a particular example, the second plurality of output nodes includes a first output node 112A, a second output node 112B, and a third output node 112C. In FIG. 1, the first output node 112A is coupled to the fourth series of inductors 148A, the second output node 112B is coupled to the fifth series of inductors 148B, and the third output node 112C is coupled to the sixth series of inductors 148C.

The particular arrangement and type of coils of the transformer 100 can be selected based on the particular application. For example, the number of coils of the transformer 100 can be varied based on the particular application. Alternatively or in addition, a number of windings of a coil can be selected to determine a particular characteristic of the transformer 100. In some examples, the number of coils of the transformer 100 and the number of windings of the coils of the transformer 100 are selected to determine a particular voltage transformation characteristic of the transformer 100, a phase relationship between input signals and output signals of the transformer 100, one or more other characteristics of the transformer 100, or a combination thereof. As a particular example, a number of coils and a number of windings of the coils can be selected to cause the transformer 100 to have a "step down" characteristic. In some implementations, each inductor of the transformer 100 has the same number of windings as other inductors of the transformer 100. In other implementations, the transformer 100 can have another configuration.

In some examples, the transformer 100 has a physical structure (e.g., alignment of inductors) selected to enable magnetic coupling between certain inductors of the transformer 100. For example, in FIG. 1, the inductor 132A is coupled to the inductor 120A at a particular angle (e.g., 120 degrees, as a non-limiting illustrative example). As another example, in FIG. 1, the inductor 136A is coupled to the inductor 132A at a particular angle (e.g., 120 degrees, as a non-limiting illustrative example). In some examples, due to angles illustrated in FIG. 1, the inductor 120A is configured to magnetically couple to the inductors 132C and 136B, the inductor 132A is configured to magnetically couple to the inductors 108B, 116B, 120B, 128B, and 136C, and the inductor 136A is configured to magnetically couple to the inductors 108C, 116C, 120C, 128C, and 132B.

In some implementations, the transformer 100 has a number of cores corresponding to a number of phases to be transformed, such as a three-core configuration for three-phase power system. To illustrate, in one example, the transformer 100 includes a first core, a second core, and a third core. In some such implementations, the inductors and output nodes of each phase are arranged to balance power drawn from each phase. For example, in FIG. 1, the transformer 100 includes six inductors (e.g., inductors 108A, 116A, 120A, 128A, 132C, and 136B) wound about a first core corresponding to a first input voltage phase, another six inductors (e.g., inductors 108B, 116B, 120B, 128B, 132A, and 136C) wound about a second core corresponding to a second input voltage phase, and another six inductors (e.g., inductors 108C, 116C, 120C, 128C, 132B, and 136A) wound about a third core corresponding to a third input voltage phase. This particular arrangement of inductors and cores of the transformer 100 is selected to balance (or decrease imbalance of) currents drawn from the transformer 100, as described further with reference to FIG. 2.

To further illustrate, in one example, the output nodes 140A, 140B, and 140C are coupled to a balanced load (e.g., an inverter that draws balanced currents from the transformer 100 that are substantially equal with respect to one another), and the output nodes 112A, 112B, and 112C are coupled to imbalanced loads (e.g., loads that consume different amounts of power than one another). To balance power drawn from each phase, each of the output nodes 112A, 112B, and 112C is responsive to at least one inductor associated with each phase. To illustrate, the output node 112A is coupled to the inductor 136A (which is wound about a core associated with the third input voltage phase), is coupled to the inductor 132A (which is wound about a core associated with the second input voltage phase), and is coupled to the inductor 128A (which is wound about a core associated with the first input voltage phase). Thus, current drawn from the output node 112A is derived substantially equally from all three input voltage phases. Accordingly, even if a load connected to the output node 112A consumes a different amount of power as compared to a load connected to the output node 112B, the output node 112C, or both, the consumed power is "shared" among (or drawn from) inductors associated with each core of the transformer 100, and currents drawn from the output nodes 112A, 112B, and 112C remain balanced. Similarly, currents drawn by one or more loads connected to the output nodes 112B and 112C are "shared" among inductors associated with each core of the transformer 100, increasing balance of the currents as compared to other techniques that draw currents separately from each core of a transformer.

During operation, certain inductors of the transformer 100 are configured to magnetically couple to certain other inductors of the transformer 100 in response to a multiphase alternating current (AC) input signal received at the input nodes 104A, 104B, and 104C. In a particular example, the first series of inductors 144A is configured to magnetically couple to the inductors 132C, 136B (e.g., due to physical alignment of the inductors 108A, 116A, 120A, 128A, 132C, and 136B). In a particular example, the second series of inductors 144B is configured magnetically couple to the inductors 132A, 136C (e.g., due to physical alignment of the inductors 108B, 116B, 120B, 128B, 132A, and 136C), and the third series of inductors 144C is configured to magnetically couple to the inductors 132B, 136A (e.g., due to physical alignment of the inductors 108C, 116C, 120C, 128C, 132B, and 136A). In a particular implementation, the output nodes 140A, 140B, and 140C are configured to output a first multiphase AC output signal, and the output nodes 112A, 112B, and 112C are configured to output a second multiphase AC output signal.

In a particular example, the transformer 100 has a neutral-forming configuration and generates a neutral voltage at the neutral terminal 152. The neutral voltage can be provided to or used in connection with one or more electrical systems, such as one or more of a single-phase electrical system or a two-phase electrical system, as an illustrative example.

The example of FIG. 1 illustrates that the transformer 100 can have a configuration that enables generation of multiple multiphase AC output signals based on a particular multiphase AC input signal. In a particular example, one multiphase AC output signal is provided to one or more electrical systems that are compatible with variable frequency power (e.g., by "bypassing" an inverter that is coupled to the transformer 100), and another multiphase AC output signal is provided to an inverter to generate a constant frequency signal for an electrical system that operates using constant frequency power. In some implementations, voltages of the multiphase AC output signals are different (e.g., where one multiphase AC output signal is "stepped down" more than another multiphase AC output signal due to a number of inductors, a number of inductor coils, or both). As a result, power consumption associated with operation of an inverter is reduced as compared to certain conventional systems that provide constant frequency power to one or more electrical systems that are compatible with variable frequency power. Further, in some cases, a size of one or more components can be reduced as compared to conventional designs. For example, a size of a transformer can be reduced (e.g., due to application of a higher-frequency signal to an input of the transformer as compared to certain conventional designs), decreasing weight and fuel consumption of a vehicle, as described further with reference to the example of FIG. 2.

Figure 2:
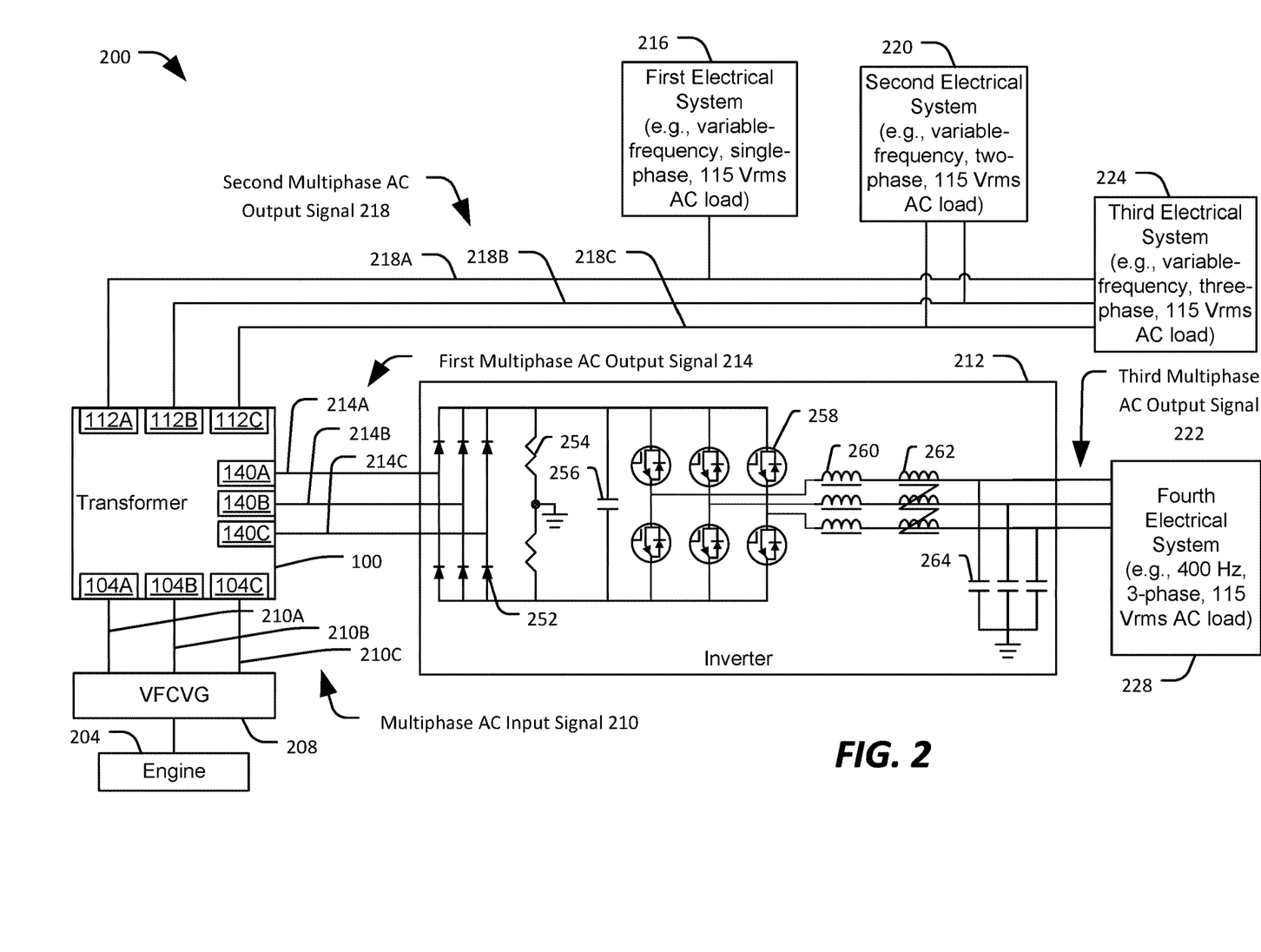
FIG. 2 is a diagram illustrating certain aspects of an example of a system that includes the transformer of FIG. 1.

Referring to FIG. 2, a particular example of a system is depicted and generally designated 200. The system 200 includes the transformer 100.

In the example of FIG. 2, the transformer 100 is coupled to a variable-frequency, constant-voltage generator (VFCVG) 208. For example, in FIG. 2, the input nodes 104A, 104B, and 104C are coupled to an output of the VFCVG 208. In a particular example, the system 200 further includes an engine 204 coupled to the VFCVG 208. In some implementations, the engine 204 corresponds to an engine of a vehicle, such as an aircraft.

In the example of FIG. 2, the system 200 further includes a first electrical system 216, a second electrical system 220, and a third electrical system 224. The electrical systems 216, 220, and 224 are coupled to the transformer 100. For example, in FIG. 2, the first electrical system 216 is coupled to the first output node 112A of the transformer 100. As additional examples, in FIG. 2, the second electrical system 220 is coupled to the output nodes 112B and 112C of the transformer 100, and the third electrical system 224 is coupled to the output nodes 112A, 112B, and 112C of the transformer 100.

To further illustrate, in one example, the first electrical system 216 includes or corresponds to a variable-frequency, single-phase, 115 volts root-mean-square (Vrms) (line to neutral) AC load. In some implementations, the second electrical system 220 includes or corresponds to a variable-frequency, two-phase, 199 Vrms (line to line) AC load (where 115*sqrt(3)=199 Vrms), and the third electrical system 224 includes or corresponds to a variable-frequency, three-phase, 115 Vrms (line to neutral) AC load. In some implementations, one or more of the electrical systems 216, 220, and 224 are configured to supply power to lighting of an aircraft, window heaters of an aircraft, one or more other components configured to operate based on a variable frequency power source, or a combination thereof.

In the example of FIG. 2, the system 200 further includes an inverter 212 coupled to the transformer 100. In the example of FIG. 2, an output of the transformer 100 is coupled to an input of the inverter 212. In a particular example, the inverter 212 is coupled to the output nodes 140A, 140B, 140C. In FIG. 2, the system 200 also includes a fourth electrical system 228 coupled to the inverter 212. In one example, the fourth electrical system 228 includes or corresponds to a 400 hertz (Hz), three-phase, 115 Vrms (line to neutral) AC load. In some implementations, the fourth electrical system 228 is configured to provide power to one or more fuel pumps of an aircraft, one or more other components configured to operate based on a constant frequency power source, or a combination thereof.

In the example of FIG. 2, the inverter 212 includes a plurality of diodes coupled to the transformer 100. In FIG. 2, the plurality of diodes includes a representative diode 252. To further illustrate, in some implementations, the inverter 212 includes two diodes coupled to the first output node 140A, two diodes coupled to the second output node 140B, and two diodes coupled to the third output node 140C. In other implementations, the inverter 212 can have a different configuration (e.g., a different number or arrangement of diodes) than illustrated in the example of FIG. 2.

In a particular example, the inverter 212 includes a plurality of resistors coupled to the plurality of diodes, such as a representative resistor 254. For example, in FIG. 2, the inverter 212 includes two resistors coupled to a ground node and to the plurality of diodes. The inverter 212 of FIG. 2 further includes a capacitor 256. In some implementations, the resistors and the capacitor 256 form a resistive-capacitive (RC) delay circuit component of the inverter 212. In other implementations, the inverter 212 can have a different configuration (e.g., a different number or arrangement of resistors or capacitors) than illustrated in the example of FIG. 2.

FIG. 2 also depicts that the inverter 212 includes a plurality of transistors, such as a representative transistor 258. The plurality of transistors can be coupled to a plurality of differential mode (DM) coils (e.g., a representative DM coil 260) and to a plurality of common mode (CM) coils, such as a representative CM coil 262. In FIG. 2, the inverter 212 further includes a plurality of capacitors (e.g., a representative capacitor 264) coupled to the plurality of CM coils. In other implementations, the inverter 212 can have a different configuration (e.g., a different number or arrangement of transistors, coils, or capacitors) than illustrated in the example of FIG. 2.

During operation, the VFCVG 208 is responsive to the engine 204 to generate a multiphase AC input signal 210. To illustrate, in some implementations, the VFCVG 208 includes a plurality of alternators configured to generate the multiphase AC input signal 210 during operation of the engine 204.

In a particular example, the multiphase AC input signal 210 includes a plurality of signals (e.g., three signals) having a particular phase relationship (e.g., a 120 degree phase offset with respect to each other). In a particular example, the multiphase AC input signal 210 includes a first signal 210A provided to the first input node 104A, a second signal 210B provided to the second input node 104B, and a third signal 210C provided to the third input node 104C. In some examples, a first phase of the first signal 210A is offset from a second phase of the second signal 210B by 120 degrees, and a third phase of the third signal 210C is offset from the second phase by 120 degrees. In a particular example, the multiphase AC input signal 208 has a voltage of 230 Vrms.

In FIG. 2, transformer 100 is configured to receive the multiphase AC input signal 210 from the VFCVG 208. In a particular example, the transformer 100 is configured to generate a first multiphase AC output signal 214 at a first plurality of output nodes (e.g., the output nodes 140A, 140B, and 140C). In a particular example, signals of the first multiphase AC output signal 214 have a particular phase relationship (e.g., a 120 degree phase offset with respect to each other). In a particular example, the first multiphase AC output signal 214 includes a first signal 214A generated at the first output node 140A, a second signal 214B generated at the second output node 140B, and a third signal 214C generated at the third output node 140C. In some examples, a first phase of the first signal 214A is offset from a second phase of the second signal 214B by 120 degrees, and a third phase of the third signal 214C is offset from the second phase by 120 degrees. In a particular example, the first multiphase AC output signal 214 has a voltage of 172.5 Vrms (line to neutral, where 230*¾=172.5 Vrms).

In FIG. 2, the transformer 100 is also configured to generate a second multiphase AC output signal 218 at a second plurality of output nodes (e.g., the output nodes 112A, 112B, and 112C). In some implementations, the transformer 100 is configured to generate the second multiphase AC output signal 218 concurrently with generating the first multiphase AC output signal 214.

In some implementations, different output signals of the transformer 100 have different characteristics. For example, as described further with reference to FIG. 3, phase of the first multiphase AC output signal 214 can differ from phase of the second multiphase AC output signal 218. As another example, in some implementations, the second multiphase AC output signal 218 is "stepped down" (e.g., attenuated) more than the first multiphase AC output signal 214 (relative to the multiphase AC input signal 210). For example, in some implementations, an input of the inverter 212 is configured to receive signals of more than 115 Vrms, such as 172.5 Vrms (line to neutral, where 230*¾=172.5 Vrms).

In the example of FIG. 2, the second multiphase AC output signal 218 includes a first signal 218A at the first output node 112A, a second signal 218B at the second output node 112B, and a third signal 218C at the third output node 112C. In a particular example, signals of the first multiphase AC output signal 214 have a particular phase relationship (e.g., a 120 degree phase offset with respect to each other). To illustrate, in some examples, a first phase of the first signal 218A is offset from a second phase of the second signal 218B by 120 degrees, and a third phase of the third signal 218C is offset from the second phase by 120 degrees. In a particular example, the second multiphase AC output signal 218 has a voltage of 115 Vrms (line to neutral).

In some implementations, the transformer 100 is configured to generate a neutral voltage (e.g., a voltage of zero or approximately zero) at the neutral terminal 152. For example, in some implementations, phase cancelation of the multiphase AC input signal 210 generates the neutral voltage at the neutral terminal 152.

In a particular example, the first electrical system 216 is configured to receive a particular signal of the second multiphase AC output signal 218, such as the signal 218A. In a particular example, the second electrical system 220 is configured to receive two signals of the second multiphase AC output signal 218 (e.g., the signals 218A and 218B), and the third electrical system 224 is configured to receive three signals of the second multiphase AC output signal 218 (e.g., the signals 218A, 218B, and 218C).

In FIG. 2, the inverter 212 is configured to receive the first multiphase AC output signal 214 and to generate a third multiphase AC output signal 222 based on the first multiphase AC output signal 214. In some implementations, the inverter 212 is configured to generate the third multiphase AC output signal 222 by adjusting a variable frequency of the first multiphase AC output signal 214 to a constant frequency (e.g., 400 Hz, as an illustrative example). In a particular example, the third multiphase AC output signal 222 has a voltage of 115 Vrms (line to neutral). In a particular example, the inverter 212 is configured to provide the third multiphase AC output signal 222 to the fourth electrical system 228.

In some implementations, the inverter 212 and the fourth electrical system 228 correspond to a balanced load (e.g., where current magnitudes of the signals 214A, 214B, and 214C are balanced with respect to one another). In some examples, the electrical systems 216, 220, and 224 are imbalanced loads that consume different amounts of power than one another. In this case, the system 200 can have one or more characteristics that balance (or reduce imbalance in) current magnitudes of the signals 218A, 218B, and 218C. For example, FIG. 2 illustrates that a single phase electrical system (e.g., the first electrical system 216) can be connected to a particular output node of the output nodes 112A, 112B, and 112C (e.g., to the output node 112A), and a two-phase electrical system (e.g., the second electrical system 220) can be connected to the other output nodes of the output nodes 112A, 112B, and 112C (e.g., to the output nodes 112B and 112C). As another example, the particular arrangement of inductors of the transformer 100 can be selected based on power consumption characteristics of the electrical systems 216, 220, and 224 to balance (or reduce imbalance in) current magnitudes of the signals 218A, 218B, and 218C.

In some examples, the multiphase AC input signal 210 and the second multiphase AC output signal 218 have a first frequency. To illustrate, in some examples, the first frequency is a variable frequency. In some implementations, the frequency of the multiphase AC input signal 210 and of the second multiphase AC output signal 218 varies during operation of the VFCVG 208. To illustrate, in one example, the frequency of the multiphase AC input signal 210 and of the second multiphase AC output signal 218 has a target of approximately 400 hertz (Hz) and can vary (e.g., within a particular range, such as 350-800 Hz, as an illustrative example) depending on certain conditions, such as speed of the engine 204, as an illustrative example.

In a particular example, the third multiphase AC output signal 222 has a second frequency that is different than the first frequency of the multiphase AC input signal 210 and the second multiphase AC output signal 218. To illustrate, in FIG. 2, the third second frequency is 400 Hz. In some examples, the second frequency is independent of variation of the first frequency (e.g., where the second frequency remains constant or substantially constant at 400 Hz independently of variation of the first frequency). In some examples, the second frequency of the third multiphase AC output signal 222 is determined by a controller that selectively activates and deactivates transistors of the inverter 212, such as the transistor 258. It is noted that particular numerical examples (e.g., voltages and frequencies) are provided for illustration and that the scope of the disclosure is not limited to these particular examples.

In some implementations, the first frequency of the multiphase AC input signal 210 and the second multiphase AC output signal 218 are greater on average than the second frequency of the third multiphase AC output signal 222. For example, in some implementations, the first frequency is greater on average than the second frequency during operation of a vehicle that includes the system 200. As a particular non-limiting example, in some implementations, the second frequency is 400 Hz, and the first frequency is on average greater than 400 Hz (e.g., due to engine speed during operation of an aircraft that includes the system 200).

By connecting an output of the transformer 100 to an input of the inverter 212, performance of the system 200 can be improved as compared to other designs, such as conventional designs that couple an input of a transformer to an output of an inverter. For example, the second multiphase AC output signal 218 can "bypass" the inverter 212 and can be provided to one or more electrical systems (such as the electrical systems 216, 220, and 224) that are operable using variable frequency power. As a result, power consumption and losses associated with operation of the inverter 212 are reduced as compared to certain conventional systems that provide constant frequency power to one or more electrical systems that are compatible with variable frequency power. Further, in some cases, a size of one or more components can be reduced as compared to conventional designs. For example, a size of the transformer 100 can be reduced (e.g., due to a greater average frequency of the multiphase AC input signal 210 as compared to the third multiphase AC output signal 222), decreasing weight and fuel consumption of a vehicle, as an illustrative example.

Figure 3:
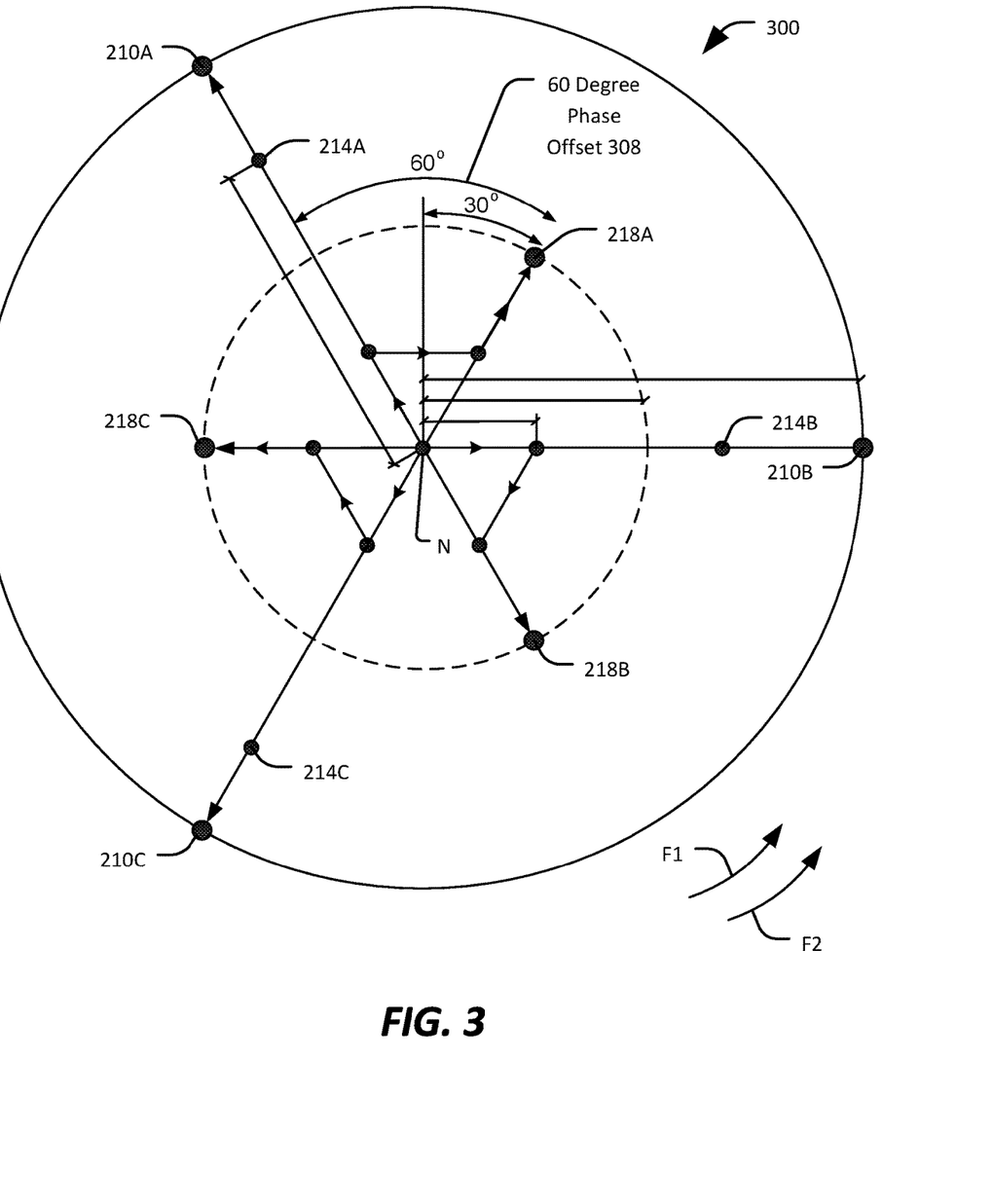
FIG. 3 is a phase diagram illustrating certain aspects of an example of operation of the transformer of FIG. 1.

Referring to FIG. 3, a particular illustrative example of a phase diagram is depicted and generally designated 300. In some implementations, the phase diagram 300 illustrates an example of operation of the transformer 100. For example, in FIG. 3, the phase diagram 300 depicts illustrative phases of the multiphase AC input signal 210, the first multiphase AC output signal 214, and the second multiphase AC output signal 218.

In FIG. 3, an origin of the phase diagram 300 corresponds to a neutral voltage N. In some examples, the neutral voltage N corresponds to a voltage level at the neutral terminal 152 during operation of the transformer 100. It is noted that the values illustrated in FIG. 3 are illustrative and that other values can be determined based on the particular implementation (e.g., by changing a number of coils in one or more inductors of the transformer 100 to achieve one or more other voltages different than illustrated in the example of FIG. 3).

The example of FIG. 3 further illustrates that the first multiphase AC output signal 214 is in phase with the multiphase AC input signal 210. Further, in FIG. 3, the second multiphase AC output signal 218 has a 60 degree phase offset 308 with respect to the multiphase AC input signal 210 and the first multiphase AC output signal 214.

In a particular example, the multiphase AC input signal 210, the first multiphase AC output signal 214, and the second multiphase AC output signal 218 have a first frequency F1, and the third multiphase AC output signal 222 of FIG. 2 has a second frequency F2 that is different than the first frequency F1. For example, in a particular implementation, the second frequency F2 is independent of variation of the first frequency F1. In one example, the first frequency F1 is variable (e.g., within a particular range, such as 350-800 Hz, as an illustrative example), and the second frequency F2 is constant (e.g., at 400 Hz, as an illustrative example). In some implementations, the first frequency F1 is on average greater than the second frequency F2.

The example of FIG. 3 illustrates that the transformer 100 of FIG. 1 can generate multiple multiphase AC output signals. As a result, certain components can be powered using variable frequency power (while other components can be powered using constant frequency power), reducing power consumption or loss associated with operation of an inverter.

Figure 4:
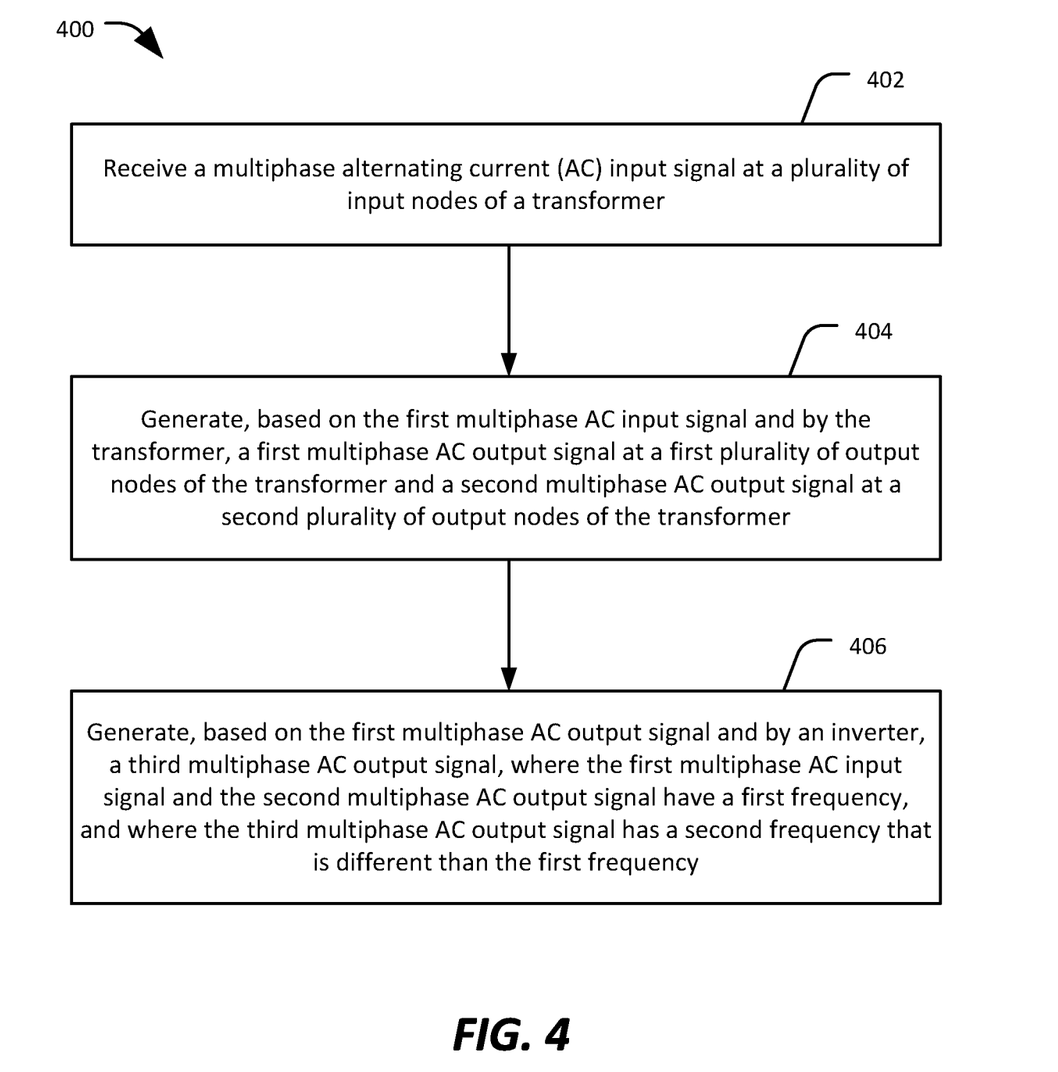
FIG. 4 is a flow chart of an example of a method of operating the transformer of FIG. 1.

Referring to FIG. 4, an illustrative example of a method of operation of a transformer is depicted and generally designated 400. In a particular example, operations of the method 400 of FIG. 4 are performed using the transformer 100.

The method 400 includes receiving a multiphase AC input signal at a plurality of input nodes of a transformer, at 402. In a particular example, the transformer 100 is configured to receive the multiphase AC input signal 210 at the input nodes 104A, 104B, and 104C.

The method 400 further includes generating, based on the multiphase AC input signal and by the transformer, a first multiphase AC output signal at a first plurality of output nodes of the transformer and a second multiphase AC output signal at a second plurality of output nodes of the transformer, at 404. In a particular example, the first plurality of output nodes includes or corresponds to the output nodes 140A, 140B, and 140C, and the second plurality of output nodes includes or corresponds to the output nodes 112A, 112B, and 112C. In a particular example, the output nodes 140A, 140B, and 140C are configured to output, based on the multiphase AC input signal 210, the first multiphase AC output signal 214, and the output nodes 112A, 112B, and 112C are configured to output, based on the multiphase AC input signal 210, the second multiphase AC output signal 218.

The method 400 further includes generating, based on the first multiphase AC output signal and by an inverter, a third multiphase AC output signal, at 406. The multiphase AC input signal and the second multiphase AC output signal have a first frequency (e.g., the first frequency F1 of FIG. 3), and the third multiphase AC output signal has a second frequency (e.g., the second frequency F2 of FIG. 3) that is different than the first frequency. To further illustrate, in some implementations, the inverter 212 is configured to receive the first multiphase AC output signal 214 (e.g., via the output nodes 140A, 140B, and 140C) and to generate the third multiphase AC output signal 222 based on the first multiphase AC output signal 214.

In some implementations, the method 400 further includes providing a first phase of the second multiphase AC output signal to a first electrical system of an aircraft. For example, in some implementations, the transformer 100 provides the first phase 218A to the first electrical system 216 via the first output node 112A.

In some implementations, the method 400 further includes providing a second phase and a third phase of the second multiphase AC output signal to a second electrical system of an aircraft. For example, in some implementations, the transformer 100 provides the second phase 218B and the third phase 218C to the second electrical system 220 via the output nodes 112A, 112B.

In some implementations, the method 400 further includes providing the first phase, the second phase, and the third phase of the second multiphase AC output signal to a third electrical system of an aircraft. For example, in some implementations, the transformer 100 provides the first phase 218A, the second phase 218B, and the third phase 218C to the third electrical system 224 via the output nodes 112A, 112B, and 112C.

In some implementations, the method 400 further includes providing the third multiphase AC output signal to a fourth electrical system of an aircraft. For example, in some implementations, the transformer 100 provides the third multiphase AC output signal 222 to the fourth electrical system 228.

In some implementations, the method 400 further includes providing, during operation of the transformer, a neutral voltage based on a neutral terminal of the transformer. For example, the transformer 100 may generate or provide the neutral voltage N of FIG. 3 at the neutral terminal 152.

In a particular example of the method 400, the second multiphase AC output signal has a 60 degree phase offset with respect to the first multiphase AC output signal and the multiphase AC input signal. For example, the second multiphase AC output signal 218 may have the 60 degree phase offset 308 with respect to the first multiphase AC output signal 214, as described with reference to the example of the phase diagram 300 of FIG. 3. In some implementations, the first multiphase AC output signal is in phase with the multiphase AC input signal (e.g., as described with reference to the first multiphase AC output signal 214 and the multiphase AC input signal 210 in the example of FIG. 3).

The example of FIG. 4 illustrates that a transformer (e.g., the transformer 100 of FIG. 1) can generate multiple multiphase AC output signals. As a result, certain components can be powered using variable frequency power (while other components can be powered using constant frequency power), reducing power consumption or loss associated with operation of an inverter. Further, in some cases, a size of one or more components can be reduced as compared to conventional designs. For example, a size of a transformer can be reduced (e.g., due to a greater average frequency of the multiphase AC input signal 210 of FIG. 2 as compared to the third multiphase AC output signal 222), decreasing weight and fuel consumption of a vehicle, as an illustrative example.

Figure 5:
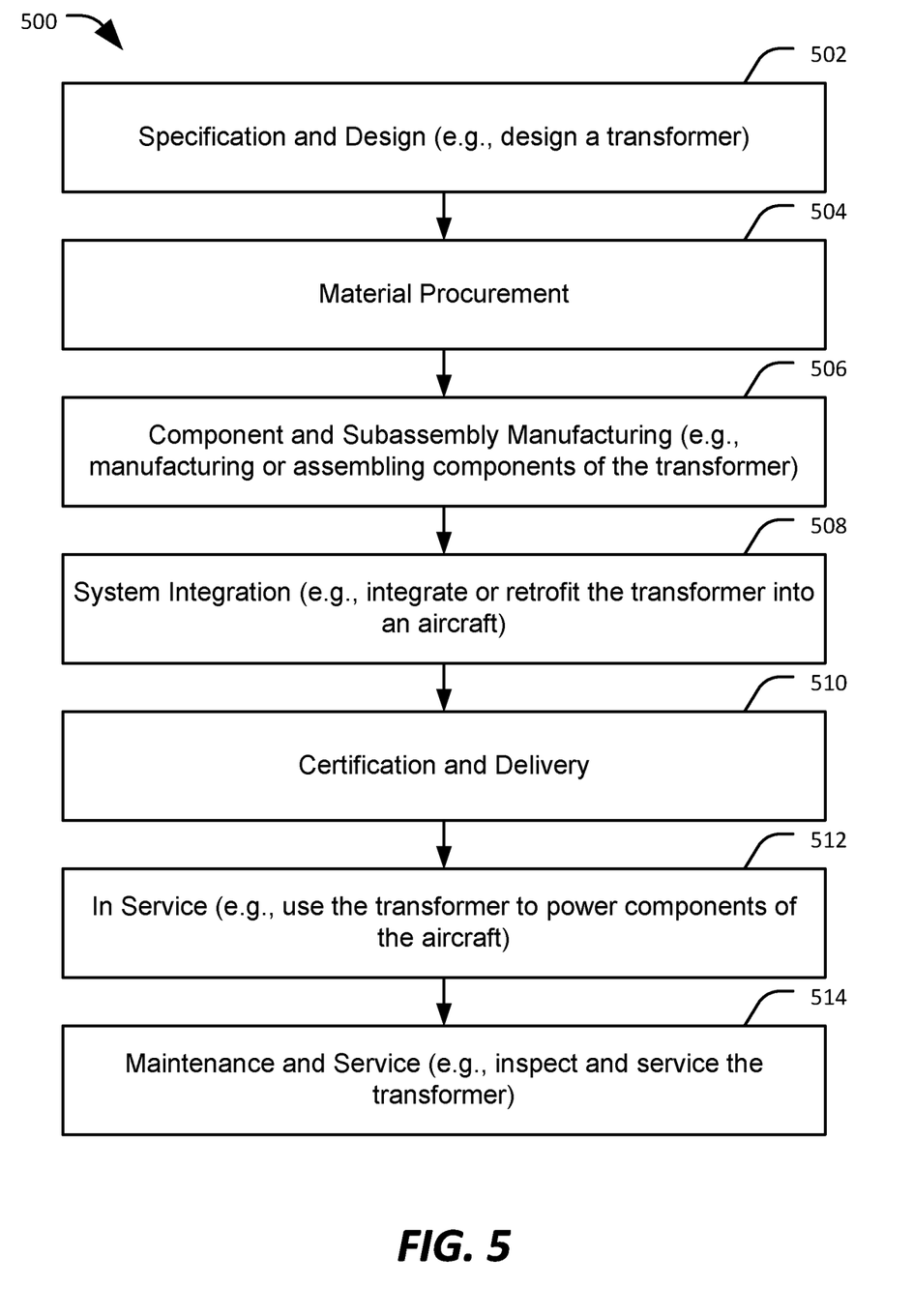
FIG. 5 is a flow chart of an example of a life cycle of a vehicle including the transformer of FIG. 1.

Referring to FIG. 5, a flowchart of an illustrative example of a life cycle of a vehicle (e.g., an aircraft) is depicted and generally designated 500. During pre-production, the method 500 includes specification and design of the vehicle, at 502. During the specification and design of the vehicle, the method 500 includes specifying components, such as the transformer 100, the engine 204, the VFCVG 208, the inverter 212, one or more of the electrical systems 216, 220, 224, and 228, or a combination thereof. In one particular example, specification and design of the vehicle includes determining a number of turns for each coil of the transformer 100 (e.g., so that the transformer 100 is configured to "step down" a multiphase AC signal from one voltage to another voltage, such as from 230 Vrms to 115 Vrms, as an illustrative example).

At 504, the method 500 includes material procurement. For example, the method 500 can include procuring materials for the vehicle, such as by procuring materials for the transformer 100, the engine 204, the VFCVG 208, the inverter 212, one or more of the electrical systems 216, 220, 224, and 228, or a combination thereof.

During production, the method 500 includes component and subassembly manufacturing, at 506, and system integration of the vehicle, at 508. In some examples, components of the transformer 100 are manufactured or assembled (at 506) and integrated within the vehicle (at 508). Alternatively or in addition, components of one or more of the engine 204, the VFCVG 208, the inverter 212, or any of the electrical systems 216, 220, 224, and 228, can be manufactured or assembled (at 506) and integrated within the vehicle (at 508).

The method 500 includes certification and delivery of the vehicle, at 510, and placing the vehicle in service, at 512. In some implementations, certifying the vehicle includes performing a test process of one or more components of the vehicle, such as by testing operation of one or more components manufactured or assembled and integrated within the vehicle. As a particular example, operation of the transformer 100 can be tested, such as by measuring voltage or current of one or more of the multiphase AC input signal 210, the first multiphase AC output signal 214, or the second multiphase AC output signal 218.

While in service, the vehicle may be scheduled for routine maintenance and service (which may also include modification, reconfiguration, refurbishment, and so on). At 514, the method 500 includes performing maintenance and service of the vehicle. To illustrate, in some examples, performing maintenance and service may include inspecting and servicing the transformer 100, the engine 204, the VFCVG 208, the inverter 212, one or more of the electrical systems 216, 220, 224, and 228, or a combination thereof.

In some implementations, operations of the method 500 are performed to "retrofit" the transformer 100 within the vehicle. In this case, the method 500 can optionally include inspecting, disconnecting, and/or removing components of a conventional transformer from the vehicle prior to installing components of the transformer 100 within the vehicle (e.g., during maintenance and service, at 514). In other implementations, the transformer 100 can be integrated within the vehicle during manufacturing of the vehicle (e.g., during system integration, at 508 in FIG. 5).

Figure 6:
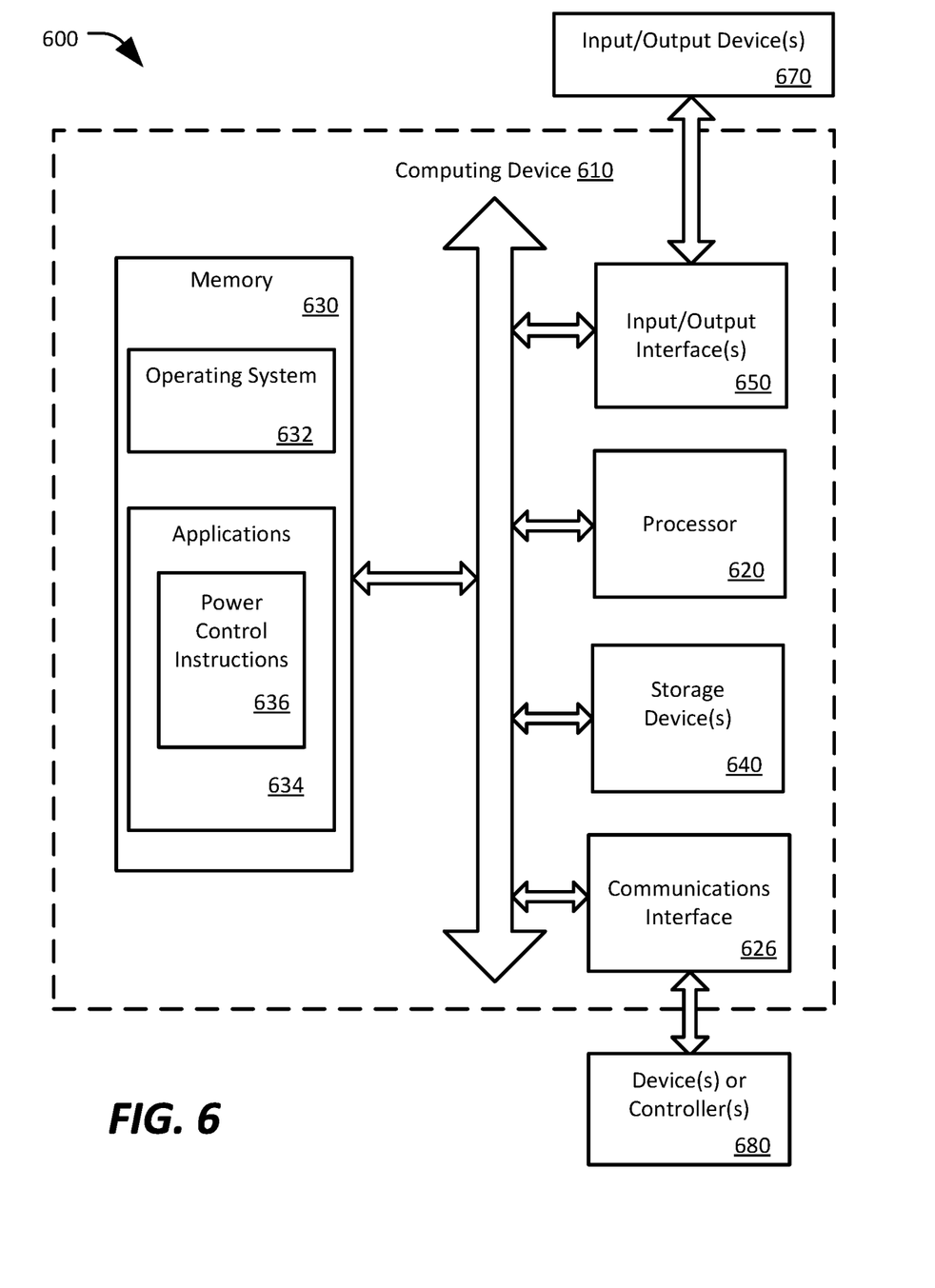
FIG. 6 is a block diagram illustrating aspects of an example of a computing system that is configured to execute instructions to initiate, perform, or control operations, such as operations of the method 500 of FIG. 5.

FIG. 6 is an illustration of a block diagram of a computing environment 600 including a computing device 610. The computing device 610 is configured to support embodiments of computer-implemented methods and computer-executable program instructions (or code) according to the disclosure. In some examples, the computing device 610, or portions thereof, is configured to execute instructions to initiate, perform, or control operations described herein, such as operations of the method 500 of FIG. 5. In some implementations, the computing device 610 is integrated within a vehicle, such as an aircraft.

The computing device 610 includes a processor 620. The processor 620 is configured to communicate with a memory 630 (e.g., a system memory or another memory), one or more storage devices 640, one or more input/output interfaces 650, a communications interface 626, or a combination thereof.

Depending on the particular implementation, the memory 630 includes volatile memory devices (e.g., volatile random access memory (RAM) devices), nonvolatile memory devices (e.g., read-only memory (ROM) devices, programmable read-only memory, or flash memory), one or more other memory devices, or a combination thereof. In FIG. 6, the memory 630 stores an operating system 632, which can include a basic input/output system for booting the computing device 610 as well as a full operating system to enable the computing device 610 to interact with users, other programs, and other devices. The example of FIG. 6 also depicts that the memory 630 stores one or more applications 634 executable by the processor 620. In some examples, the one or more applications 634 include instructions executable by the processor 620 to transmit data or signals between components of the computing device 610, such as the memory 630, the one or more storage devices 640, the one or more input/output interfaces 650, the communications interface 626, or a combination thereof.

In the example of FIG. 6, the one or more applications 634 include power control instructions 636. In a particular example, the processor 620 is configured to execute the power control instructions 636 to initiate or control operations of the system 200, such as by sending one or more control signals to engine 204 or to the VFCVG 208 to generate the multiphase AC input signal 210. In this example, the processor 620 is configured to execute the power control instructions 636 to initiate or control operations of the transformer 100 (e.g., by causing the VFCVG 208 to provide the multiphase AC input signal 210 to the transformer 100 to cause the transformer 100 to generate the first multiphase AC output signal 214 and the second multiphase AC output signal 218).

Alternatively or in addition, in some examples, the processor 620 is configured to execute the power control instructions 636 to cause one or more of the electrical systems 216, 220, 224, and 228 to receive power. To illustrate, in one example, after activating the engine 204 or the VFCVG 208, the processor 620 is configured to execute the power control instructions 636 to activate one or more switches that cause one or more of the electrical systems 216, 220, 224, and 228 to receive power based on the first multiphase AC output signal 214 and the second multiphase AC output signal 218.

Alternatively or in addition, in some examples, the processor 620 is configured to execute the power control instructions 636 to cause the inverter 212 to generate the third multiphase AC output signal 222 based on the first multiphase AC output signal 214. For example, in some implementations, the power control instructions 636 indicate a frequency at which transistors of the inverter 212 (such as the transistor 258) are to be selectively activated, selectively deactivated, or both. In a particular example, the processor 620 is configured to execute the power control instructions 636 to cause the inverter 212 to generate the third multiphase AC output signal 222 based on the second frequency F2 described with reference to FIG. 3.

In some implementations, one or more storage devices 640 include nonvolatile storage devices, such as magnetic disks, optical disks, or flash memory devices. In some examples, the one or more storage devices 640 include removable memory devices, non-removable memory devices or both. In some cases, the one or more storage devices 640 are configured to store an operating system, images of operating systems, applications, and program data. In a particular example, the memory 630, the one or more storage devices 640, or both, include tangible computer-readable media.

In the example of FIG. 6, the processor 620 is configured to communicate with the one or more input/output interfaces 650 to enable the computing device 610 to communicate with one or more input/output devices 670 to facilitate user interaction. In some implementations, the one or more input/output interfaces 650 include one or more serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 670 include keyboards, pointing devices, displays, speakers, microphones, touch screens, one or more other devices, or a combination thereof. In some examples, the processor 620 is configured to detect interaction events based on user input received via the one or more input/output interfaces 650. Alternatively or in addition, in some implementations, the processor 620 is configured to send information to a display via the one or more input/output interfaces 650.

In a particular example, the processor 620 is configured to communicate with (e.g., send signals to) one or more devices 680 using the communications interface 626. In some implementations, the communications interface 626 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 680 include host computers, servers, workstations, one or more other computing devices, or a combination thereof.

Figure 7:
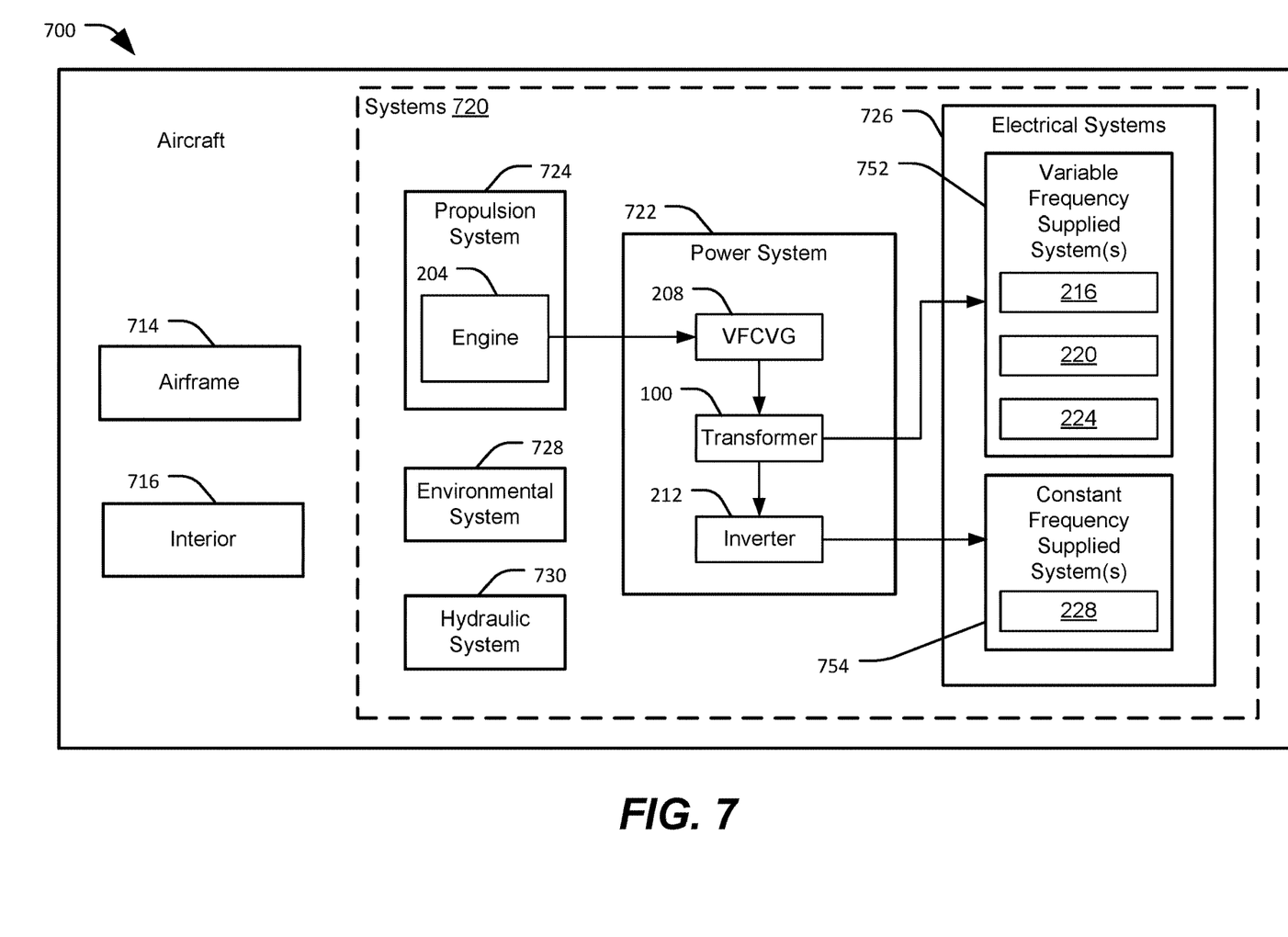
FIG. 7 is a block diagram illustrating aspects of an illustrative implementation of a vehicle that includes the transformer of FIG. 1.

Aspects of the disclosure may be described in the context of an example of a vehicle, such as an aircraft 700 as shown in the example of FIG. 7. As shown in FIG. 7, the aircraft 700 includes an airframe 714 with an interior 716 and a plurality of systems 720. Examples of the plurality of systems 720 include one or more of a propulsion system 724, an environmental system 728, a hydraulic system 730, a power system 722, and electrical systems 726. In the example of FIG. 7, the propulsion system 724 includes the engine 204, and the power system 722 includes the VFCVG 208, the transformer 100, and the inverter 212.

FIG. 7 also illustrates that the electrical systems 726 include one or more variable frequency supplied systems 752 and one or more constant frequency supplied systems 754. In the example of FIG. 7, the one or more variable frequency supplied systems 752 include the electrical systems 216, 220, and 224, and the one or more constant frequency supplied systems 754 include the fourth electrical system 228.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
    a plurality of input nodes configured to receive a multiphase alternating current (AC) input signal;
    a plurality of inductors coupled to the plurality of input nodes;
    a neutral terminal coupled to the plurality of inductors;
    a first plurality of output nodes coupled to the plurality of inductors and configured to output a first multiphase AC output signal; and
    a second plurality of output nodes coupled to the plurality of inductors and configured to output a second multiphase AC output signal.

2. The apparatus of claim 1, wherein the plurality of inductors includes:
    a first inductor coupled to a first input node of the plurality of input nodes and to a first output node of the first plurality of output nodes;
    a second inductor coupled to a second input node of the plurality of input nodes and to a second output node of the first plurality of output nodes; and
    a third inductor coupled to a third input node of the plurality of input nodes and to a third output node of the first plurality of output nodes.

3. The apparatus of claim 1, wherein the plurality of inductors includes:
    a first series of inductors coupled to the neutral terminal and to a first input node of the plurality of input nodes;
    a second series of inductors coupled to the neutral terminal and to a second input node of the plurality of input nodes; and
    a third series of inductors coupled to the neutral terminal and to a third input node of the plurality of input nodes.

4. The apparatus of claim 3, wherein the first series of inductors, the second series of inductors, and the third series of inductors are arranged in a star configuration.

5. The apparatus of claim 3, wherein the first series of inductors includes a first particular inductor coupled to the neutral terminal and to a first particular node, wherein the second series of inductors includes a second particular inductor coupled to the neutral terminal and to a second particular node, and wherein the third series of inductors includes a third particular inductor coupled to a third particular node and to the neutral terminal.

6. The apparatus of claim 5, wherein the plurality of inductors further includes:
   a fourth series of inductors coupled to the first particular node and to a first output node of the second plurality of output nodes;
   a fifth series of inductors coupled to the second particular node and to a second output node of the second plurality of output nodes; and
   a sixth series of inductors coupled to the third particular node and to a third output node of the second plurality of output nodes.

7. The apparatus of claim 1, further comprising an inverter coupled to the first plurality of output nodes.

8. The apparatus of claim 1, further comprising a variable frequency, constant voltage generator (VFCVG) coupled to the plurality of input nodes and configured to generate the multiphase AC input signal.

9. A system comprising:
   a transformer comprising a neutral terminal, a plurality of input nodes configured to receive a multiphase alternating current (AC) input signal, a first plurality of output nodes configured to output, in response to the multiphase AC input signal, a first multiphase AC output signal, and a second plurality of output nodes configured to output, in response to the multiphase AC input signal, a second multiphase AC output signal; and
   an inverter coupled to the transformer, the inverter configured to generate a third multiphase AC output signal based on the first multiphase AC output signal,
   wherein the multiphase AC input signal and the second multiphase AC output signal have a first frequency (F1), and
   wherein the third multiphase AC output signal has a second frequency (F2) different than the first frequency.

10. The system of claim 9, wherein the transformer and the inverter are included within an aircraft.

11. The system of claim 9, further comprising a plurality of inductors coupled to the plurality of input nodes and to the neutral terminal.

12. The system of claim 9, further comprising a variable frequency constant voltage generator (VFCFG) configured to generate the multiphase AC input signal.

13. The system of claim 9, wherein the second frequency is independent of variation of the first frequency.

14. A method comprising:
   receiving a multiphase alternating current (AC) input signal at a plurality of input nodes of a transformer;
   generating, based on the multiphase AC input signal and by the transformer, a first multiphase AC output signal at a first plurality of output nodes of the transformer and a second multiphase AC output signal at a second plurality of output nodes of the transformer; and
   generating, based on the first multiphase AC output signal and by an inverter, a third multiphase AC output signal,
   wherein the multiphase AC input signal and the second multiphase AC output signal have a first frequency (F1), and
   wherein the third multiphase AC output signal has a second frequency (F2) that is different than the first frequency.

15. The method of claim 14, further comprising providing a first phase of the second multiphase AC output signal to a first electrical system of an aircraft.

16. The method of claim 15, further comprising:
   providing a second phase and a third phase of the second multiphase AC output signal to a second electrical system of the aircraft; and
   providing the first phase, the second phase, and the third phase of the second multiphase AC output signal to a third electrical system of the aircraft.

17. The method of claim 16, further comprising providing the third multiphase AC output signal to a fourth electrical system of the aircraft.

18. The method of claim 14, further comprising, during operation of the transformer, providing a neutral voltage (N) based on a neutral terminal of the transformer.

19. The method of claim 14, wherein the second multiphase AC output signal has a 60 degree phase offset with respect to the first multiphase AC output signal and the multiphase AC input signal.

20. The method of claim 14, wherein the first multiphase AC output signal is in phase with the multiphase AC input signal.

* * * * *